US012660836B2

(12) United States Patent
Dubief et al.

(10) Patent No.: US 12,660,836 B2
(45) Date of Patent: Jun. 23, 2026

(54) METHOD TO ROAST COFFEE BEANS

(71) Applicant: SOCIETE DES PRODUITS NESTLE S.A., Vevey (CH)

(72) Inventors: Flavien Florent Dubief, Champagne (CH); Joel Morend, Chatonnaye (CH)

(73) Assignee: Societe des Produits Nestle S.A., Vevey (CH)

( * ) Notice: Subject to any disclaimer, the term of this patent is extended or adjusted under 35 U.S.C. 154(b) by 748 days.

(21) Appl. No.: 17/998,087

(22) PCT Filed: May 7, 2021

(86) PCT No.: PCT/EP2021/062190
§ 371 (c)(1),
(2) Date: Nov. 7, 2022

(87) PCT Pub. No.: WO2021/228721
PCT Pub. Date: Nov. 18, 2021

(65) Prior Publication Data
US 2023/0165268 A1 Jun. 1, 2023

(30) Foreign Application Priority Data
May 11, 2020 (EP) ..................................... 20173946

(51) Int. Cl.
| | |
|---|---|
| *A23F 5/04* | (2006.01) |
| *A23N 12/12* | (2006.01) |
| *F24F 11/00* | (2018.01) |
| *G06Q 30/018* | (2023.01) |
(Continued)

(52) U.S. Cl.
CPC .............. *A23F 5/04* (2013.01); *A23N 12/125* (2013.01); *F24F 11/0001* (2013.01);
(Continued)

(58) Field of Classification Search
CPC ...... A23F 5/04; A23N 12/125; F24F 11/0001; F24F 2110/65; G06Q 30/018; F24C 15/20
See application file for complete search history.

(56) References Cited

U.S. PATENT DOCUMENTS

2017/0319002 A1 11/2017 Tan et al.

FOREIGN PATENT DOCUMENTS

| | | |
|---|---|---|
| CN | 1278705 A | 1/2001 |
| CN | 208092531 U | 11/2018 |
(Continued)

OTHER PUBLICATIONS

Https://dailycoffeenews.com/wp-content/uploads/2017/09/Just-Coffee-Niosh-report.pdf; Evaluation of exposures and respiratory health at a coffee roasting and packaging facility; LeBouf et al.; p. 1-67; Aug. 2017; Report No. 2015-0082-3287. (Year: 2017).*
(Continued)

*Primary Examiner* — Steven N Leff
(74) *Attorney, Agent, or Firm* — K&L Gates LLP

(57) ABSTRACT

The invention concerns a method to roast coffee beans in a room (100), said method comprising the steps of wherein, when at least one roasting operation is implemented, —obtaining desired roasting data input of said at least one roasting operation, said desired data input, —getting access to information relative to the room and to the coffee beans roasting apparatus, and —before initiating the at least one roasting operation: determining the concentration of each contaminant generated in the room during said at least one roasting operation, for each contaminant, comparing the determined concentration of said contaminant generated in the room with the concentration of said contaminant authorized according to local health and safety regulations.

18 Claims, 5 Drawing Sheets

(51) Int. Cl.
*F24C 15/20* (2006.01)
*F24F 110/65* (2018.01)

(52) U.S. Cl.
CPC ............ *G06Q 30/018* (2013.01); *F24C 15/20* (2013.01); *F24F 2110/65* (2018.01)

(56) References Cited

FOREIGN PATENT DOCUMENTS

| | | |
|---|---|---|
| EP | 3311675 | 4/2018 |
| EP | 3355290 A1 | 8/2018 |
| JP | H11504518 A | 4/1999 |
| JP | 7624996 B2 | 1/2025 |
| RU | 2706189 C2 | 11/2019 |
| SU | 119792 A1 | 11/1958 |
| WO | 2016037993 | 3/2016 |
| WO | 2017178393 A1 | 10/2017 |
| WO | 2020084134 | 4/2020 |

OTHER PUBLICATIONS

Chinese Office Action for Appl No. 202180029376.3 dated Sep. 23, 2024, 5 pages.
Russian Office Action for Appl No. 2022130256/10 dated Sep. 30, 2024, 8 pages.
Chinese Office Action for Appl No. 202180029376.3 dated Mar. 3, 2025, 4 pages.
Japanese Office Action for Appl No. 2022-566383 dated Sep. 16, 2025, 3 pages.

* cited by examiner

| | Input Data |
|---|---|
| Coffee Roasted Per Day (KG) | 10 |
| Roasting Scenario | Consecutive |
| Roasting Level | Dark |
| Bean Type | Robusta |
| Beans Per Roast (G) | 100 |

Risk of Contamination

| | Suggest |
|---|---|
| Coffee Roasted Per Day (KG) | 10 |
| Roasting Scenario | Split Over 8 Hours |
| Roasting Level | Dark |
| Bean Type | Robusta |
| Beans Per Roast (G) | 100 |

1

METHOD TO ROAST COFFEE BEANS

CROSS REFERENCE TO RELATED APPLICATIONS

The present application is a National Stage of International Application No. PCT/EP2021/062190, filed on May 7, 2021, which claims priority to European Patent Application No. 20173946.3, filed on May 11, 2020, the entire contents of which are being incorporated herein by reference.

FIELD OF THE INVENTION

The present invention relates to a method for roasting coffee beans in a safe environment.

BACKGROUND OF THE INVENTION

The roasting of coffee beans is a well-known process. The main steps consist in heating the beans to a desired roasting level and then cooling or quenching the heated beans to stop the roasting. During heating, smoke is emitted. This smoke contains safe and desired compounds all together, in particular the usual roasted coffee aroma, but also undesired less safe compounds such as diacetyl, pyridine, 2-furane methanol, caffeine furfural, formaldehyde, acetaldehyde, $CO$, $CO_2$, $NO_2$, $SO_2$, ozone and particulate matters (PM2.5, PM10).

When roasting is implemented in manufacturing places producing important quantities of roasted beans, generally all the conditions for catching unsafe compounds are supplied.

But there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful compounds are emitted too. When the roaster is used in a closed environment like a shop, café or restaurant, the emission of some compounds can become harmful depending on the size of the room, the ventilation of the room, . . . . For people working several hours in the room, smelling the smokes of the roaster can lead to a health problem. The strong odor of roasting can become a pain after several hours.

As a result, in such an environment, it is recommended to treat the smoke produced by the roaster to avoid any healthy issue for people present in the shop. The existing solutions consist in filtering or using catalytic converter to catch or destroy harmful compounds of the smoke or even evacuating the smoke outside by an outlet duct connected to the roaster. In practice, it has been observed that these current existing solutions do not guarantee a zero emission or at least a safe reduction of harmful compounds systematically. Actually, roasters operated in shops, cafés or restaurants can be used to roast various different beans sometimes at different levels of roasting in order to provide their customers with variety and original or customized roasted beans. Due to this variety, a wide range of beans and roasting conditions are implemented. These different beans and these different roasting conditions emit different types and levels of compounds and the existing solutions may not be configured to treat smokes of some unusual roasting that would emit particularly high concentrated in harmful compounds.

In addition, in each shop, the operator can roast different quantities of coffee beans per day. A small shop with a high output of roasted beans may rapidly reach a high level of contaminants inside the shop and require a very efficient treatment of the smoke from the roaster which may not be required in a big café roasting less coffee beans.

Lastly, the size of the shop, café or restaurant, as well as the ventilation rate inside the room, can vary with a direct impact on the concentration of emitted contaminants in the public room.

In a public environment, it is essential to guarantee that health and safety regulations are respected during the roasting operations.

An object of the present invention is to provide a method that predicts and enables the safe operation of a system for roasting in a room.

SUMMARY OF THE INVENTION

In a first aspect of the invention, there is provided a method to roast coffee beans in a room, using a roasting system, said roasting system comprising:
   a roasting apparatus, and
   optionally a smoke treating unit configured to treat the smoke produced by the roasting apparatus and to release treated smoke in the room, wherein, when at least one roasting operation is implemented, said method comprises the steps of:
   obtaining desired roasting data input of said at least one roasting operation, said desired data input determining at least:
      the type of coffee beans to be roasted,
      the quantity of coffee beans to be roasted per roasting operation or over a period of time,
      the level of roasting to be applied to the beans,
      and optionally the number of roasting operations over a period of time, and
   getting access to:
      information relative to the room, said room information comprising at least: the local health and safety regulations, the volume of the room and the ventilation rate of said room,
      information relative to the coffee beans roasting apparatus, said roasting apparatus information comprising at least the quantity of each contaminant produced by the roasting apparatus during the operation of roasting a specific quantity of a specific type of coffee beans up to a specific roasting level,
      optionally information relative to the smoke treating unit, said smoke treating unit information comprising at least the performance of reduction of the level of each contaminant by said smoke treating unit, and
   before initiating the at least one roasting operation:
      determining the concentration of each contaminant generated in the room during said at least one roasting operation from the obtained desired roasting data input and accessible information relative: to the coffee beans roasting apparatus, to the room and optionally to the smoke treating unit,
      for each contaminant, comparing the determined concentration of said contaminant generated in the room with the concentration of said contaminant authorised according to local health and safety regulations,
      if, for each contaminant, the determined concentration is inferior to the authorised concentration according to local health and safety regulations, enabling the at least one roasting operation, if, for at least one contaminant, the determined concentration is superior to the authorised concentration according to local health and safety regulations, displaying an alert.

In the method, the used system is configured to stand and be operated in a room.

Any type of roasting apparatus can be used. In the roasting apparatus, coffee beans are heated and preferably mixed to homogenise heating through the beans.

The source of heating can be a burner (meaning combustion) fed by natural gas, liquefied petroleum gas (LPG) or even wood. Alternatively, the heat source can be an electrical resistor, a ceramic heater, a halogen source, a source of infrared or of microwaves.

Preferably the source of heating is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The mixing of the beans can be obtained with a fluidic bed of hot air or mechanically with stirring blades or a rotating drum.

Preferably the roasting apparatus is a hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively, the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment, generally hot air.

The roasting apparatus comprises an outlet from which smoke produced during the roasting operation can be evacuated.

Generally, the smoke treating unit treats the smoke produced by the roasting apparatus in order to reduce or eliminate the harmful contaminants the smoke contains. Yet, some small home roasting apparatuses do not comprise any smoke treating unit and are simply used under a kitchen hood that treats and/or evacuates out of the room the smoke directly emitted from the roasting apparatus.

When a smoke treating unit is present, preferably, the smoke treating unit of the system comprises a smoke inlet configured to cooperate with this smoke outlet of the roasting apparatus and to collect smoke through this smoke inlet.

Depending on the size of the roasting apparatus, the smoke treating unit can comprise:

an active treating unit that destroys contaminants inside the apparatus, such as an afterburner enabling thermal oxidation of contaminants or a catalytic afterburner or a catalytic device providing selective catalytic reduction with ammonia sleep catalyst to filter $NO_x$ or an active device that retains contaminants such as desulfurization of gases trapping $SO_2$ by dry or wet technology, a wet scrubber retaining VOC and particulate matters or an electrostatic precipitator to retain particulate matters after ionisation by means of high voltage, or a passive treating unit that retains contaminants inside the apparatus like mechanical filters (metallic sieves or paper filter), an active carbon filter or a cyclone, or a combination of the above units.

By yield of a smoke treating unit in reducing the level of one particular compounds present inside the smoke, it is understood the percentage of reduction of said compound present in the smoke after treatment by that smoke treating unit.

An afterburner thermally oxidises any types of gas and particulate matters, in particular contaminants like CO and $CO_2$, at very high temperatures, generally above 700° C., and converts them into oxides such as $CO_x$, $NO_x$, $SO_x$.

A catalytic afterburner comprises a ceramic or metallic substrate coated with a catalytic impregnating agent containing precious metals, such as nanoparticles of copper oxide, nanoparticles of iron oxide, and typically one or more metals of the platinum group (platinum, palladium, rhodium). The operation of the catalytic afterburner requires a lower temperature than an afterburner: the temperature is generally comprised between 300° C. and 500° C. Conveniently, although not necessarily, before the smoke is passed into the catalytic converter, it is pre-heated, generally by means of a heat-exchanger fed with the smoke emerging from the catalytic converter.

Filters are usually able to retain volatile organic compounds (VOCs), hydrocarbons and particulate matters (PM). The smoke treating unit can comprise several filters depending on their ability to retain specific contaminants. Filters configured for trapping VOCs and hydrocarbons are preferably active carbon filter or charcoal filter. Filters configured for trapping particulate matters are preferably high efficiency particulate accumulator (HEPA) filters, metallic filters (for example ultrafine steel wool media filter) or paper filter. Electrostatic precipitators can be used to trap PM.

Depending on the type of filtering elements of the smoke treating unit, the smoke treating units can comprise a smoke driver, like a fan, in order to move the smoke from the outlet of the roasting apparatus to the smoke treating unit.

Some smoke treating units can comprise a condenser to decrease the temperature of the treated smoke before it is dispensed inside the room.

According to one preferred embodiment, the smoke filtering unit comprises successively: a HEPA filter, an electrostatic precipitator and then an active carbon filter according to the movement of the flow of the smoke inside the smoke treating unit. A smoke driver sucks smoke at the downstream end of this unit.

Such a smoke treating unit can be installed in public rooms like cafés, shops or restaurants in particular due to its easy operation or maintenance by non-specialised operators.

The smoke treating unit can be an apparatus independent from the roasting apparatus or smoke treating unit can be integrated inside the roasting apparatus, both forming one single apparatus. It is particularly the case for small home roasters with at least one integrated filter. In a particular embodiment, the smoke treating unit can be an air purifier which treats the whole air of the room. In that embodiment, the smoke treating unit is not directly attached to the smoke outlet of the roasting apparatus.

The system comprises a control system operable to control the roasting process of the roasting system and to implement the steps of the method to roast.

In particular, before at least one roasting operation is implemented, for example when at least one roasting operation is selected, the method comprises the step of obtaining desired roasting data input of said at least one roasting operation, said desired data input determining:

the type of coffee beans to be roasted, the quantity of coffee beans to be roasted per roasting operation or over a period of time, the level of roasting to be applied to the coffee beans, eventually the number of roasting operations over a period of time.

This roasting use data input indicates the intended use of the roasting apparatus for one roasting operation or for several operations during a pre-determined period in order to determine the quantity of each contaminant produced by the roasting apparatus during said period.

At each roasting operation, contaminants are produced and dispensed through the smoke. These contaminants include in particular critical gaseous compounds like: CO, $CO_2$, diacetyl, formaldehyde, methanol, NO, $NO_2$, pyridine, $SO_2$, 2-furanmethanol, and particulate matters such as $PM_{10}$, $PM_{2.5}$. The list may depend on the type of roasting apparatus used. For example, roasting apparatus using fuel as the heating source may generate $CO_2$ which is not the case of an electrically energised roasting apparatus.

The produced amount of these contaminants at each roasting operation depend on several factors and at least on:

the nature of the coffee beans that are roasted. For example, roasting of *Robusta* coffee beans produces contaminants different from roasting of *Arabica* beans.

the quantity of the coffee beans that are roasted, the level of roasting applied to the coffee beans. The production of light roasted beans emit less contaminants than dark roasted beans.

Depending on the commercial habits of the coffee shop owner, the number of roasting operations per day, the times at which the roasting operations happen during the day can impact the concentration of contaminants in the room during the whole day or during a peak operation period.

In one mode, the roasting data input indicating the intended use of the roasting apparatus can be obtained for one roasting operation only and can comprise at least:

the type of coffee beans to be roasted, and the quantity of coffee beans, and the level of roasting to be applied to the beans.

If the operator does not provide all the roasting data input, for example only the type is provided, the other roaster data (here for example the type and the roasting level) can be set to default values like the maximal amount and the darkest level.

In another mode, the roasting data input indicating the intended use of the roasting apparatus can be obtained for several roasting operations over a period of time such as all the programmed roasting operations of the day including input providing for these operations at least:

the type of coffee beans to be roasted, and the quantity of coffee beans, and the level of roasting to be applied to the beans, or by default the type, the quantity and/or the roasting level can be set to default values like the maximal amount and the darkest level.

In another mode, the roasting data input indicating the intended use of the roasting apparatus can be obtained for a global quantity of coffee beans over a period of time such as per day. The period of time during which the intended use happens usually correspond to the opening hours of a coffee shop and/or to specification of regulations for example about 8 hours. It can eventually be adapted depending of the type of public room (restaurant, coffee shop, bar, . . . ).

Optionally roasting data input indicating the intended use of the roasting apparatus can be obtained about the intervals between roasting operations precisely or selectable in a limited list of inputs like: consecutive, spread over 8 hours, every 15 minutes, every half an hour.

The method comprises the step of getting access to information relative to the room, said room information comprising at least: the health and safety regulations, the volume of the room and the ventilation of said room.

When the system is used in shop or restaurant, the health and safety regulations relate to regulations the roasting system shall respect in a public and working area. In this step of getting access to room information, the maximum number of people that can be present in the room may be indicated too; actually some health and safety regulations in public areas and working environments are linked to this piece of information.

When the system is used at home, other types of health and safety regulations may apply.

Generally, these regulations provide the authorised concentrations of specific contaminants.

These regulations can vary per country or geographical area.

These regulations can be stored in a memory of the control system of the system for roasting based on the country of installation of the roasting apparatus, for example they can be pre-determined in the memory of the control system by an operator at the time of installation (configuration setting of the roasting apparatus)

Alternatively, these regulations can be stored in a remote server accessible by the control system of the roasting system and accessible and selected by providing the country of installation of the roasting apparatus. This embodiment presents the advantage of enabling easy upgrade of the regulations on the database and automatic respect of updated regulations by the roasting system.

The room volume can be stored in a memory of the control system for example it can be pre-determined in the memory of the control system by an operator at the time of installation of the system (configuration setting of the roasting apparatus).

The ventilation rate corresponds to the volume of air refreshed from the room per hour, it is usually expressed in $m^3/h$. It is used to estimate the air exchange and therefore the natural elimination of contaminants from the room along time.

The air exchange depends on the type of room and building with specific insulation and on the type of ventilation installed within. Ventilation can be configured to push air out, suck air inside and passive inlets and/or outlets like windows, doors, openings with grids can be present with different dimensions.

Usually, the ventilation rate is stored in the memory of the control system for example by the operator at the time of installation of the system in the room.

The method comprises the step of getting access to information relative to the coffee beans roasting apparatus, said roasting apparatus information comprising at least the quantity of each contaminant produced by the roasting apparatus during the operation of roasting a specific quantity of a specific type of coffee beans up to a specific roasting level.

These quantities are usually stored in the memory of the control system or in a remote server accessible by said control system. These quantities can form an accessible database.

Usually these quantities are defined by experimentation by implementing different roasting scenarios in the roasting apparatus and measuring the quantity of each contaminant in the produced smoke.

Preferably, the quantity of at least one contaminant comprised in the list of: CO, $CO_2$, diacetyl, formaldehyde, $PM_{10}$, $PM_{2.5}$, methanol, NO, $NO_2$, pyridine, $SO_2$, 2-furanmethanol and produced by the roasting apparatus during the intended use of the roasting is accessible.

In some embodiments, the quantity for a family of compounds can be accessed rather than the quantity of each contaminant of said family, for example NO and $NO_2$ can be grouped together.

When the system comprises a smoke filtering unit, the method comprises the step of getting access to information relative to the smoke treating unit, said smoke treating unit information comprising at least the performance of reduction of the level of each contaminant by said smoke treating unit.

This performance can be stored in a memory of the control system or in a remote server accessible by said control system. This performance can form an accessible database.

Usually the performances are defined by previous experimentation which consists in treating different contaminants with the smoke treating unit and in measuring the quantity of each contaminant after treatment. Optionally they can be defined according to the specification of the smoke treating unit provided by the manufacturer.

Preferably, the performance of reduction of the level of at least one contaminant comprised in the list of: CO, $CO_2$, diacetyl, formaldehyde, $PM_{10}$, $PM_{2.5}$, methanol, NO, $NO_2$, pyridine, $SO_2$, 2-furanmethanol is accessible.

Before initiating the at least one roasting operation, the method comprises the step of determining the concentration of each contaminant generated in the room during the at least one roasting operation from: the obtained desired roasting data input and the accessible information relative to the coffee beans roasting apparatus, relative to the room and optionally relative to the smoke treating unit.

In a first step of this operation to determine concentration, based on the obtained desired roasting use data and on the accessible information relative to the coffee beans roasting apparatus, the method can comprise the step of obtaining the specific quantities of the contaminants produced along said at least one roasting operation.

If the desired roasting use relates to one roasting operation only, the method comprises the step of getting access to the produced quantities during that operation and if the desired roasting use relates to several roasting operations over time, the method comprises the step of getting access to the quantities produced over the period of use.

The concentration of at least one contaminant comprised in the list of: CO, $CO_2$, diacetyl, formaldehyde, $PM_{10}$, $PM_{2.5}$, methanol, NO, $NO_2$, pyridine, $SO_2$, ozone and 2-furanmethanol is determined.

Depending on the health and safety regulations to be respected, the respective quantities of at least the contaminants concerned by the regulations is determined. By default, the control system can be configured to determine the respective quantities of produced contaminants.

When the system comprises a smoke treating unit, in a second step of this operation to determine concentration, based on information relative to the smoke treating unit, for each produced contaminant, the method comprises the step of applying the yield of reduction to the obtained quantity of said contaminant produced by the roasting apparatus during the at least one roasting operation and to obtain the quantity of said contaminant dispensed by the smoke treating unit. As a result, the quantity of each contaminant dispensed by the system of the roasting apparatus and the smoke treating unit during the at least one roasting operation is determined.

If the roasting apparatus forms one single apparatus with the smoke treating unit (for example if the filter is integrated inside the roasting apparatus, like in a small home roaster, or if the roasting apparatus is always operated with the same smoke filtering unit), the first and the second steps can be combined, the method comprising the step of getting access to information relative to the specific combination of the coffee beans roasting apparatus with the smoke treating unit, said information comprising at least the quantity of each contaminant produced by said combination of the coffee beans roasting apparatus and the smoke treating unit.

This quantity is dispensed in the room and, based on the volume of the room, provides the maximum concentration of said contaminant in the room. Yet due to the presence of the ventilation and the removal of a part of air and contaminant from the room, the real concentration is lower than this maximal concentration.

In a final step of this operation to determine concentration, based on the accessible information relative to the ventilation rate and the room size, for each contaminant, the method comprises the step of calculating from the ventilation rate and the room size and from the obtained quantity of each contaminant dispensed by the system, the concentration of each contaminant present in the room during said at least one roasting operation.

Here, the ventilation rate is taken into account by applying a rate of decrease of the concentration of the contaminants along time which determines the concentration of each contaminant generated in the room during said at least one roasting operation.

The step of determining the concentration of each contaminant present in the room during the time period can be implemented with different levels of precision. In a basic mode, it can be considered that all the contaminants produced during one roasting operation are produced and emitted in the room simultaneously at a certain time of the roasting operation (for example at a time comprised between the first crack and the second crack).

In a more precise mode, the kinetics of emissions of the different contaminants during the time of one roasting operation can be taken into account.

The step of determining the concentration of each contaminant present in the room over a period can take into account the accumulation of contaminants further to successive roasting operations. New emitted contaminants can be added to the quantity of emitted contaminants of the precedent roasting operation(s) that have not yet been evacuated by the ventilation of the room.

Then, for each contaminant, the method comprises the step of comparing the determined concentration of said contaminant generated in the room with the concentration of said contaminant authorised according to the accessible local health and safety regulations.

If, for each contaminant, the determined concentration is inferior to the authorised concentration according to local health and safety regulations, then the at least one roasting operation is enabled.

But if, for at least one contaminant, the determined concentration is superior to the authorised concentration according to local health and safety regulations, then an alert is displayed.

Preferably, the at least one roasting operation is prevented if, for at least one contaminant, the determined concentration is superior to the authorised concentration according to local health and safety regulations.

Preferably a modification of the at least one roasting operation is suggested if, for at least one contaminant, the determined concentration is superior to the authorised concentration according to local health and safety regulations.

Different modifications can be suggested separately or in combination:

to the method can comprise the steps of:
calculating the quantity of beans to be roasted in order to get a quantity of specific components present in the room along the at least one roasting operation inferior to the authorised limits of said specific components according to local health and safety regulations, and
suggesting decreasing the quantity of beans introduced in the vessel down to that calculated quantity or suggest splitting the quantity of beans in several batches of said calculated quantity and suggest roasting said batches separately at defined intervals.

the method can comprise the steps of:
calculating the maximum level of roasting to be applied to said beans in order to get a quantity of specific components present in the room along the at least one roasting operation inferior to the authorised limits of said specific components according to local health and safety regulations, and
suggesting decreasing the level of roasting to be applied to said beans down to that calculated maximum level.

the method can comprise the step of suggesting improving the filtering properties of the smoke treating unit, in particular by operating a cleaning operation, replacing the smoke treating unit by a more efficient unit and/or increasing the ventilation rate.

In one embodiment, the method can comprise the steps of getting access to room information, said room information comprising the quantity of specific components present in the room at the moment of initiating the at least one roasting operation, and wherein, if the calculated quantity of specific components present in the room along the roasting process is superior to the authorised limits of specific according to local health and safety regulations, the method comprises the step of evaluating if an interval of time before initiating the at least one roasting is necessary.

Preferably, the room comprises at least one sensor to detect the quantity of said at least one specific component present in the room. Preferably, the room comprises a sensor to detect PM and VOC. Said at least one sensor can be positioned in the room apart the roasting system or at the outlet of the smoke filtering unit or at the outlet of the roasting apparatus if no smoke filtering unit is present.

Alternatively, the method can comprise the steps of:
storing information about the previous roasting operations implemented inside the room including information about:
the quantity of at least some components produced during said previous roasting processes, and
the time these previous operations happened, and
calculating the time length necessary for the ventilation of the room to reduce the quantity of said components present in the room to enable a further roasting In one embodiment, the method can comprise the steps of: determining the concentration of each contaminant generated in the room during the roasting operation from at least information relative to the smoke treating unit, said information comprising at least the performance of reduction of the level of each contaminant by said smoke treating unit, and wherein said information is adjusted on account of the status of dirtiness or ageing of the smoke treating unit.

Indeed, depending on the type of smoke filtering unit used in the system, this unit may require periodical cleaning or maintenance to be fully operational and be able to meet the performance of reduction of the level of each contaminant as set in the information accessible by the control system. In particular, mechanical filters, active carbon filters or electrostatic precipitators require cleaning to remove filtered components. Depending on time elapsed since the last cleaning operation, the performance of reduction of the level of contaminant can be decreased. The decrease in performance can be pre-determined based on experimentations on the smoke filtering unit or by machine learning based on relationship between times of cleaning operations and control of the performance of reduction of the level of contaminants by control sensors.

In one embodiment, the method can comprise the steps of obtaining a desired data input that determines a daily roasting quantity of coffee beans, and, if the roasting operation is enabled, proposing a schedule of roasting operations over the day.

According to this embodiment:
an alert can be displayed each time it is time to start one scheduled roasting operation.
the schedule of roasting operations can be adapted if at least one scheduled operation is cancelled or if at least one non-scheduled operation happens during the day.
the schedule of roasting operations during pre-determined periods of the day, like lunch time, can be prevented. This configuration avoids a too strong smell of roasted coffee in a restaurant room during lunch time.
mitigation actions can be suggested such as increasing momently the ventilation rate or by opening the windows.

In one embodiment, live estimated concentration of contaminants in the room can be displayed.

According to this embodiment, information about the time one new roasting operation can be operated based on a selected type of beans, quantity of beans and level of roasting can be displayed.

In one embodiment, the roasting system can comprise:
a duct to connect the smoke outlet of the roasting apparatus or the outlet of the smoke treating unit, said duct being configured to divert contaminants away from the room, such as a duct connected to the outside of the room, and
a device to close or open said duct, such as a movable shutter, and, if for at least one contaminant the determined concentration is superior to the authorised concentration according to local health and safety regulations, the method can comprise the step of opening said duct during the at least one roasting operation.

This embodiment enables the operator to implement any desired roasting operation in a safe manner in terms of health and safety regulations in the room by evacuating all the contaminants produced by the roasters or not treatable by the smoke filtering unit outside the room.

In one embodiment, the method can comprise the steps of:
storing the determined concentration of each contaminant generated in the room during said at least one roasting operation with the obtained desired roasting data input, and getting access to said stored determined concentration of each contaminant when identical roasting data input are obtained for at least one roasting operation.

With this embodiment, the steps of obtention and determination of the different produced contaminants can be shortened by reference to already determined roasting scenarios.

In one embodiment, the method can comprise the step of actuating a safe mode operation of the roasting apparatus, wherein, when said mode is actuated, the method can comprise the steps of:

getting access to pre-determined unsafe roasting data, and preventing the input of said pre-determined unsafe roasting data.

This safe mode of the roasting apparatus can be selected through a display of the system and prevents the operator to select the worst conditions of roasting that would directly lead to a level of at least one contaminant above the authorised concentration. Prevention of selection can be obtained by displaying selectable pre-determined safe roasting data only or based on first and second data input (for example type and quantity of beans), not enabling the selection of any third data input (for example any level of roasting) or proposing selection in a restricted list of third data input guaranteeing safe roasting.

The pre-determined unsafe roasting data can be set up in the memory in the control system for example when the system is installed in the room and when information relative to the room are inputted.

This mode guarantees the operator that he will not have to redefine new desired roasting data for his desired roasting operation if this operation happens to be determined as not safe.

In a second aspect, there is provided a system for roasting coffee beans in a room, said system comprising:

a roasting apparatus, and optionally a smoke treating unit configured to treat the smoke produced by the roasting apparatus and to release treated smoke in the room, a control system operable to implement the method to roast coffee beans such as described above.

According to a third aspect, there is provided a computer program comprising instructions which, when executed by a computer, processor or control unit, cause the computer, processor or control unit to perform the method to roast such as described above.

Preferably the instructions of the computer program are executed by the processing unit of the roasting apparatus.

In one embodiment the instructions of the computer program can be executed by the processing unit of a device external to the coffee beans roasting apparatus, such as a mobile device.

According to a fourth aspect, there is provided a computer readable storage medium comprising instructions which, when executed by a computer, processor or control unit cause the computer, processor or control unit to carry out the method such as described above.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE EXEMPLARY EMBODIMENTS

System for Roasting

Figure 1:
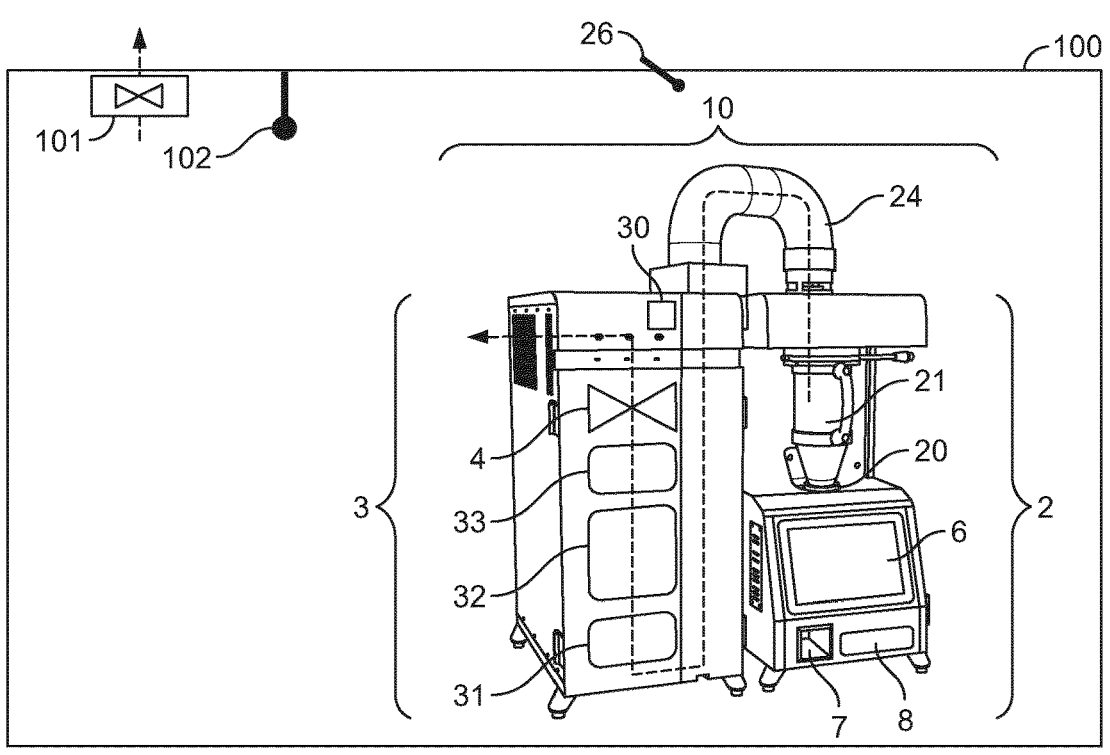
FIG. 1 is schematic drawing illustrating a system of a roasting apparatus and a smoke treating unit operated in a room.

FIG. 1 shows an illustrative view of a system 10 of a roasting apparatus 2 and a smoke treating unit 3. Functionally, the roasting apparatus is operable to roast coffee beans and the smoke treating unit is operable to treat the smoke generated during roasting by the roasting apparatus.

Roasting Apparatus

The roasting apparatus 2 is operable to receive and roast coffee beans inside a roasting chamber 21.

Preferably, the roasting apparatus 1 comprises a roasting chamber 12 in which a flow of hot air is introduced to agitate and heat the beans. The hot air flow is usually produced by a heater 20 positioned below the roasting chamber in the illustrated embodiment.

The roasting of the beans generates a smoke 24 that is driven to the top opening of the roasting chamber.

Generally a chaff collector is in flow communication with the top opening of the chamber to receive chaffs that have progressively separated from the beans during roasting and due to their light density are blown off to the chaff collector.

The rest of the smoke 24 is evacuated in direction of the smoke treating unit 3.

Smoke Treating Unit

The smoke treating unit 3 is operable to receive and treat the smoke 24 emitted at the smoke outlet of the roasting apparatus.

The smoke treating unit 3 comprises a smoke inlet adapted to collect the smoke 24. The smoke treating unit 3 can be of different natures. In the specific embodiment illustrated in FIG. 1, the smoke treating unit 3 comprises several filters such as a device 31 adapted for filtering large particulate matter $PM_{10}$ (for example a HEPA filter), a device 32 adapted for filtering small particulate matter $PM_{2.5}$ (for example electrostatic precipitator) and an active carbon filter 33 adapted to remove VOCs from the smoke. Finally the smoke treating unit comprises a smoke driver 4, generally a fan, for sucking the contaminated smoke 24 from the inlet through the filters, where it is treated, to the outlet, where it is dispensed in ambient atmosphere.

The roasting system 10 is positioned and operated in a room 100. The room 100 comprises a ventilation 101 configured to refresh air from the room.

Usually the roasting system 10 is used in a room 100 opened to public like a shop, a café or a restaurant. Accordingly, the operator of the system and consumers are present in the room while the system is roasting coffee beans and is emitting treated smoke from the smoke treating unit 3. The treated smoke can be further evacuated from the room by the ventilation 101.

The use of this system must respect the health and safety regulations defined for the public and for workers (roasters, waiters) at the place of operation.

Depending on the volume of the room, the ventilation, the health and safety regulations, the frequency of the roasting operations, the efficiency of the smoke treating unit, the room environment may become unsafe at least temporary.

The control system 80 of the roasting system is configured to implement a safe process of roasting by guaranteeing that the level contaminants produced by the roasting operation in the room falls under the limits defined of the health and safety regulations.

Control System of Roasting Apparatus

Figure 2:
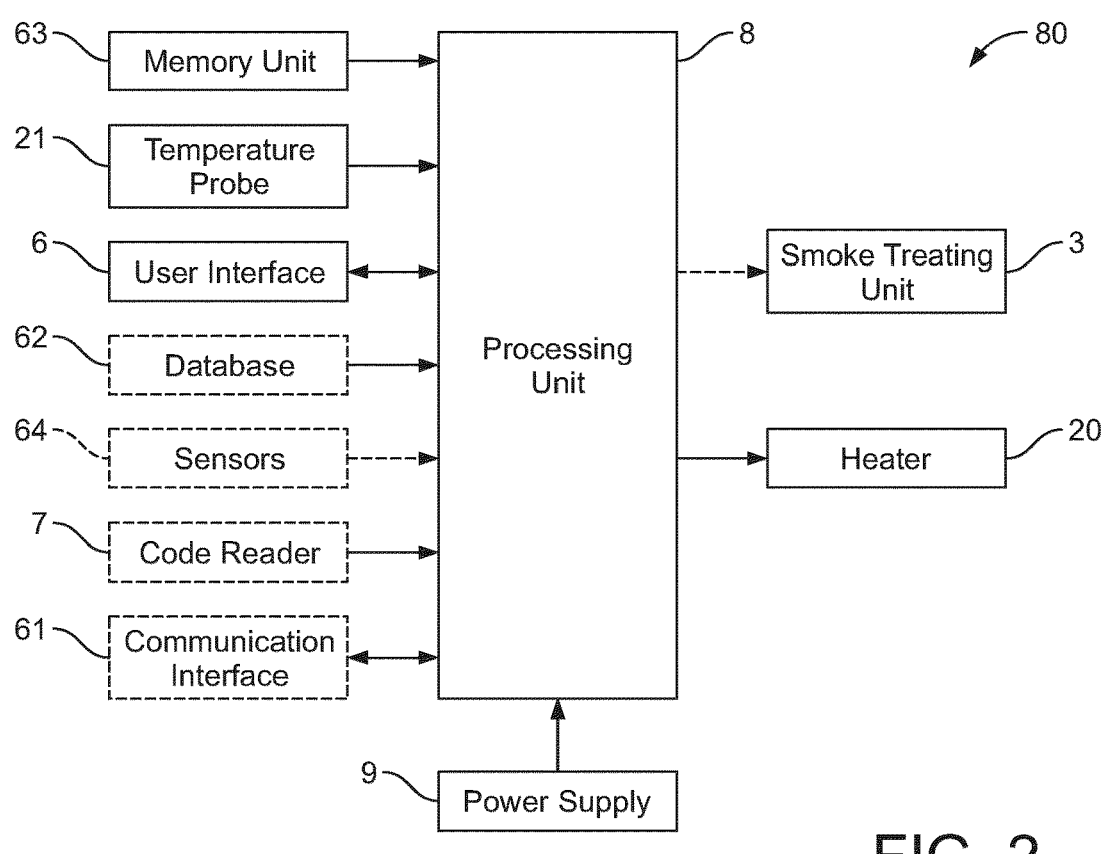
FIG. 2 is a block diagram of the controller of a system according to the invention.

With reference to FIGS. 1 and 2, the control system 80 of the roasting apparatus will now be considered: the control system 80 is operable to control the components of the apparatus to roast coffee beans. The control system 80 typically comprises at a second level of roasting apparatus: the user interface 6, the processing unit 8, a power supply 9, a memory unit 63, optionally a database 62, at least one temperature probe 21, optionally sensors 102, optionally a communication interface 61 for remote connection, optionally a code reader 7 or any combination of these devices.

The user interface 6 comprises hardware to enable a user to interface with the processing unit 8, by means of user interface signal. More particularly, the user interface receives commands from an operator or user, the user interface signal transfers the said commands to the processing unit 8 as an input. The commands may, for example, be an instruction to execute a roasting process and/or to adjust an operational parameter of the roasting apparatus 2 and/or to power on or off the roasting apparatus 2 and optionally the smoke treating unit 3 if it is commanded by the same control unit. The processing unit 8 may also output feedback to the user interface 6 as part of the roasting process, e.g. to indicate the roasting process has been initiated or that a parameter associated with the process has been selected or to indicate the evolution of a parameter during the process or to create an alarm.

In addition, the user interface can be used to alert about a possible unsafe use of the roasting apparatus and suggest recommendations as described below.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 6 can be formed as one unit or a plurality of discrete units.

A part of the user interface can also be on a mobile app when the apparatus is provided with a communication interface 61 as described below. In that case at least a part of input and output can be transmitted to the mobile device through the communication interface 61.

The temperature probe 21 is operable to provide an input signal to the processing unit 8 for regulating of the roasting process and/or a status of the roasting apparatus. The input signal can be an analogue or digital signal. Various sensors can be used and typically comprise one or more of the following sensors: level sensor associated with the chamber 21, air flow rate sensor, position sensor associated with the chamber and/or the chaff collector.

A code reader 7 can be provided and operable to read a code, for example on coffee beans package, and automatically provide an input that is the identification of the type Cn coffee beans introduced in the chamber 21.

The processing unit 8 generally comprise memory, input and output system components arranged as an integrated circuit, typically as a microprocessor or a microcontroller. The processing unit 8 may comprise other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programmed logic or to additionally comprise programmed logic. The processing unit 8 may also comprise one or more of the aforementioned integrated circuits. An example of the later is several integrated circuits arranged in communication with each other in a modular fashion e.g.: a slave integrated circuit to control the user interface 6 in communication with a master integrated circuit to control the roasting apparatus 10.

The power supply 9 is operable to supply electrical energy to the said controlled components and the processing unit 8. The power supply 9 may comprise various means, such as a battery or a unit to receive and condition a main electrical supply. The power supply 9 may be operatively linked to part of the user interface 6 for powering on or off the roasting apparatus 10.

The processing unit 8 generally comprises a memory unit 63 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

Part of the instructions stored on the memory unit 63 can be idealised as comprising a coffee beans roasting program.

The control system 80 is operable to apply this coffee beans roasting program by controlling the heater 20 using signal of the temperature probe 21.

The coffee beans roasting program can effect control of the said components using extraction information encoded on the code and/or other information that may be stored as data on the memory unit 63 or from a remote source through the communication interface 61 and/or input provided via the user interface 6 and/or signal of the sensors 19.

In addition part of the instructions stored on the memory unit 63 can be idealised as comprising a program to control the safe roasting as will be described below.

The control system 80 can comprise a communication interface 61 for data communication of the roasting apparatus 10 with another device and/or system, such as a server system, a mobile device and/or a physically separated measuring apparatus like the smoke filtering unit 3. The communication interface 61 can be used to supply and/or receive information related to:

the coffee beans roasting process, such as roasting process information, type of the beans, quantity of beans, and such as quantity of each contaminant produced by the roasting apparatus during the operation of roasting a specific quantity of a specific type of coffee beans up to a specific roasting level, and the treatment of the smoke by the smoke treating unit, such as the performance of reduction of the level of each contaminant.

The communication interface 61 may comprise first and second communication interface for data communication with several devices at once or communication via different media.

The communication interface 61 can be configured for cabled media or wireless media or a combination thereof, e.g.: a wired connection, such as RS-232, USB, 120, Ethernet define by IEEE 802.3, a wireless connection, such as wireless LAN (e.g. IEEE 802.11) or near field communication (NFC) or a cellular system such as GPRS or GSM. The communication interface 61 interfaces with the processing unit 8, by means of a communication interface signal. Generally, the communication interface comprises a separate processing unit (examples of which are provided above) to control communication hardware (e.g. an antenna) to interface with the master processing unit 8. However, less complex configurations can be used e.g. a simple wired connection for serial communication directly with the processing unit 8.

Usually, the processing unit 8 enables access to different pre-defined roasting recipes ($R_{M_A}$, $R_{M_B}$, . . . ), the recipes being adapted to the roasting of specific types of coffee beans or coffee blends ($C_A$, $C_B$, . . . ) and preferably specific quantities ($M_A$, $M_B$, . . . ) of said beans or blends.

These recipes can be stored in the memory 63 of the processing unit 8. Alternatively, these data can be stored in a remote server and the processing unit 8 can be supplied with access to this remote server through the communication interface 61, directly or indirectly through a mobile device establishing connection between the remote server and the processing unit.

The control system 80 can comprise a database 62 storing information about coffee beans, in particular about the operation conditions for roasting specific coffee beans as described hereunder. The database 62 can be stored locally in the memory 63 of the control system of the roasting apparatus or remotely in a server accessible through the communication interface 61.

In one alternative embodiment, the control system can be provided with the roasting recipes $R_{M_n}$ (and depending on the embodiment with their associated specific quantities $M_n$) during a code reading operation, these pieces of information being encoded inside the code and decoded by the control system.

In addition, the processing unit 8 enables access to:

information relative to the room 100 where the roasting apparatus 2 is operated. In particular information about the local health and safety regulations to be respected in this room 100 and information about the ventilation rate of said room. Generally, such information can be stored in the memory unit 63, for example at the moment of installation of the roasting apparatus in the room and in a step of setting the various fixed parameters of the roasting apparatus (that is the parameters that do not change from one roasting operation to another).

information relative the quantities of the different contaminants produced by the roasting apparatus 2 during the operation of roasting a specific quantity of a specific type of coffee beans up to a specific roasting level. Such information can be stored in the memory unit 63 or in a database 62 located in the roasting apparatus or in a remote server and accessible through the communication interface 61.

Preferably, such information provides the produced quantity of at least one contaminant comprised in the list of: CO, $CO_2$, diacetyl, formaldehyde, $PM_{10}$, $PM_{25}$, methanol, NO, $NO_2$, pyridine, $SO_2$, ozone and 2-furanmethanol during the operation of roasting a specific quantity of a specific type of coffee beans up to a specific roasting level.

Such information is usually established by experimentation on the roasting apparatus with different conditions of use, these conditions covering all the usual roasting uses, in particular the following conditions:

use of different types of coffee beans (*Arabica, Robusta,* blend), use of different quantities of beans per roasting operation (depends on the capacity of the roasting chamber), roasting beans at different levels (light, medium, dark).

information relative to the smoke treating unit 3 that treats the smoke produced by the roasting apparatus, in particular at least the performance of reduction of the level of specific contaminants by said smoke treating unit. Such information can be stored in the memory unit 63 or in a database 62 located in the roasting apparatus or in a remote server and accessible through the communication interface 61.

Such information is usually established by experimentation on the smoke treating unit with different contaminants preferably by accredited laboratories. Measures can be done directly by means of VOCs or PM sensors or indirectly by accumulation of contaminants on specific substrates during the full roasting operation.

Figure 3:
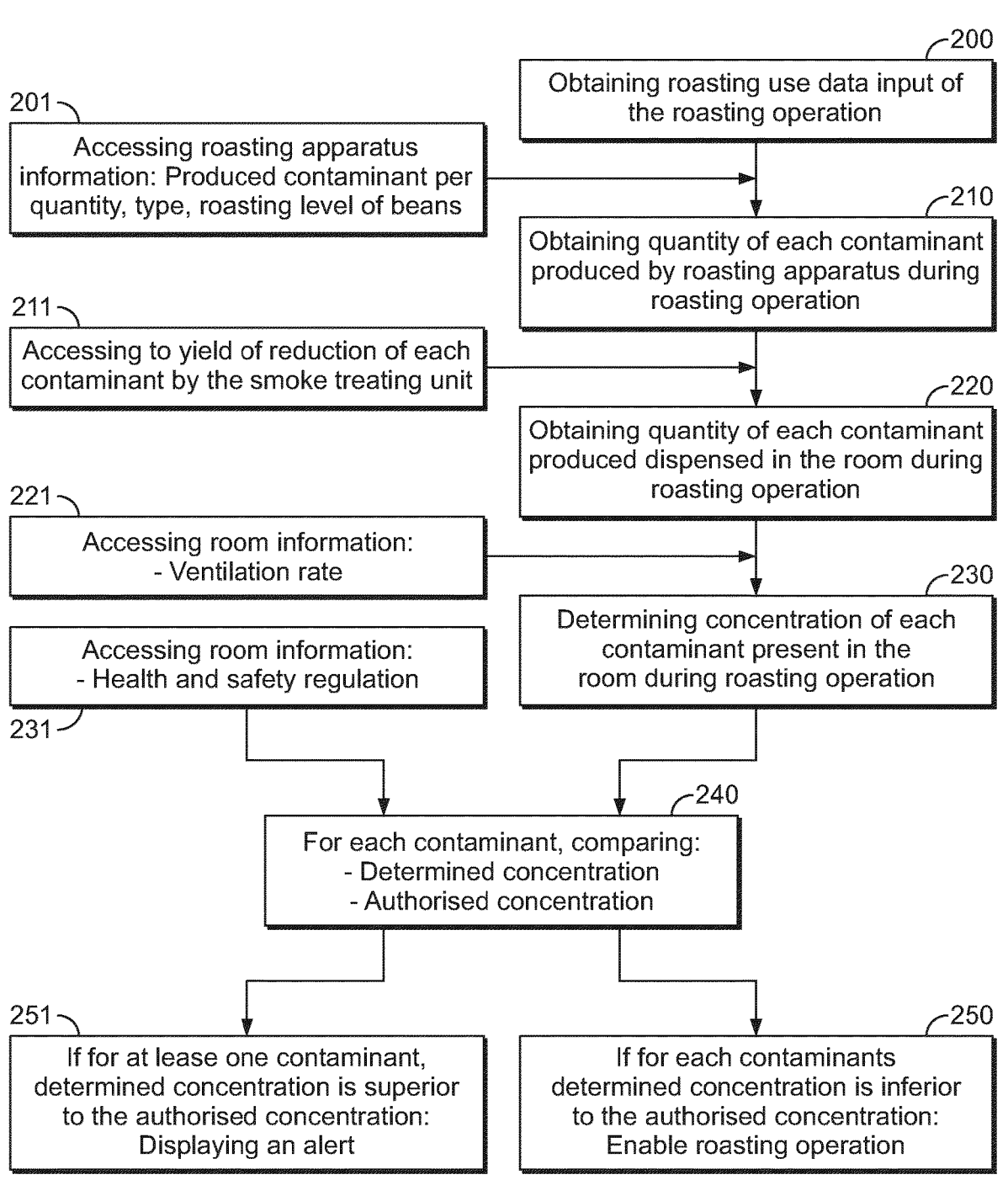
FIG. 3 illustrates the implementation of a roasting operation in an apparatus according to FIGS. 1 and 2, FIGS. 4 and 5 provide illustrated curves of the concentration of one contaminant in the room during intended uses of different roasting systems.

FIG. 3 is a block diagram illustrating the different steps during the implementation of a roasting operation by the control system 80 of an apparatus according to FIG. 1 or 2.

In step 200, operator can input data relative to the desired roasting for the roasting operation to be implemented. Such data relates at least to:

the type of coffee beans that are going to be roasted, and the quantity of coffee beans that are going to be roasted, and the level of roasting to be applied to these beans, optionally the number of roasting operations over a period of time. Such data can correspond to the habits of the operator in terms of roasting during the opening hours, that is usually during 8 consecutive hours. Following pieces of information can be provided:

the quantity of coffee bans roasted per day, and the times of the roasting operations or the intervals between roasting operations during the pre-determined period. This piece of information can be provided by suggesting a list of scenarios like: consecutive, spread over 8 hours, every 15 minutes, every half an hour, . . .

optionally the amount of beans roasted per roasting operation, by default this amount is set to be the maximum amount that can be contained in the roasting chamber of the roasting apparatus.

optionally the roasting level of the coffee beans at the end of the roasting operation, by default this level is set to be dark because the roasting to dark level creates more contaminants than other types.

optionally the type of coffee beans roasted in the roasting apparatus.

In step 201, the control system gets access to information about quantities of contaminants produced during the roasting operation defined at step 200.

Depending on the level of details of the accessible information, the control system can be configured:

to obtain the quantities of contaminants corresponding exactly or to the closest roasting use data input (for example contaminants can be provided for roasting of quantities of beans differing by 250 g like 250, 500, 750 and 1000 g. If it is desired to roast 600 g, the accessible information about contaminant produced with 500 g, that is the closest quantity of beans, may be obtained), or to calculate the quantities of contaminants from the accessible information (based on the above example, e.g. by applying a factor based on the difference of quantity with accessible information).

If the desired roasting use relates to one roasting operation only, the control system gets access to the produced quantities during that single operation and if the desired roasting use relates to several roasting operations over time, the control system gets access to the quantities produced over each roasting operation of the period of use.

In step 211, the control system gets access to the yield of reduction of each contaminant by the smoke treating unit 3 part of the roasting system.

In step 220, based on:

the quantity of each contaminant produced by the roasting apparatus 2 during the desired roasting operation, and on the yield of reduction of each of said contaminant by the smoke treating unit 3, the concentration of each contaminant dispensed by the system 10 is obtained.

This concentration is obtained by calculating the whole quantity of each contaminant, either gaseous or particulate matter, emitted during the desired roasting operation(s) inside the room 100 and then calculating the part of the contaminants trapped by the smoke treating unit 3.

In the particular case where the roasting system does not comprise a smoke filtering unit, either directly connected to the roasting apparatus or present in the room, the steps 220 and 221 are not implemented and the quantities obtained at step 210 are used in step 230 directly.

In another particular case where the roasting apparatus 2 and the smoke treating unit 3 form one single apparatus 10, it may not be necessary to implement the steps 211 and 220 if in step 201 the control system is able to get access to contaminants produced by the combination of the roasting apparatus 2 with the smoke treating unit 3 and dispensed in the room.

Before step 221, the input of a sensor 102 configured to measure the concentration of specific components in the room 100 or at the roaster air inlet can be taken into account. For example, if the room comprises another apparatus that can emit some components identical to those emitted by the roasting system (such as oven or cooking devices). This sensor would enable to take into account the built-up of these components by all the emitting apparatuses.

In step 221, the control system gets access to the ventilation rate or the ACPH of the room and the room size and, based on this ventilation rate, in step 230, the concentration of each contaminant present in the room during the roasting operation is determined.

This determination consists in calculating the part of contaminant removed from the room based on the air change per hour and, if at step 200 several roasting operations over a period of time were inputted, reproducing the calculation for all the scheduled roasting operations along the predetermined period.

Figure 4:
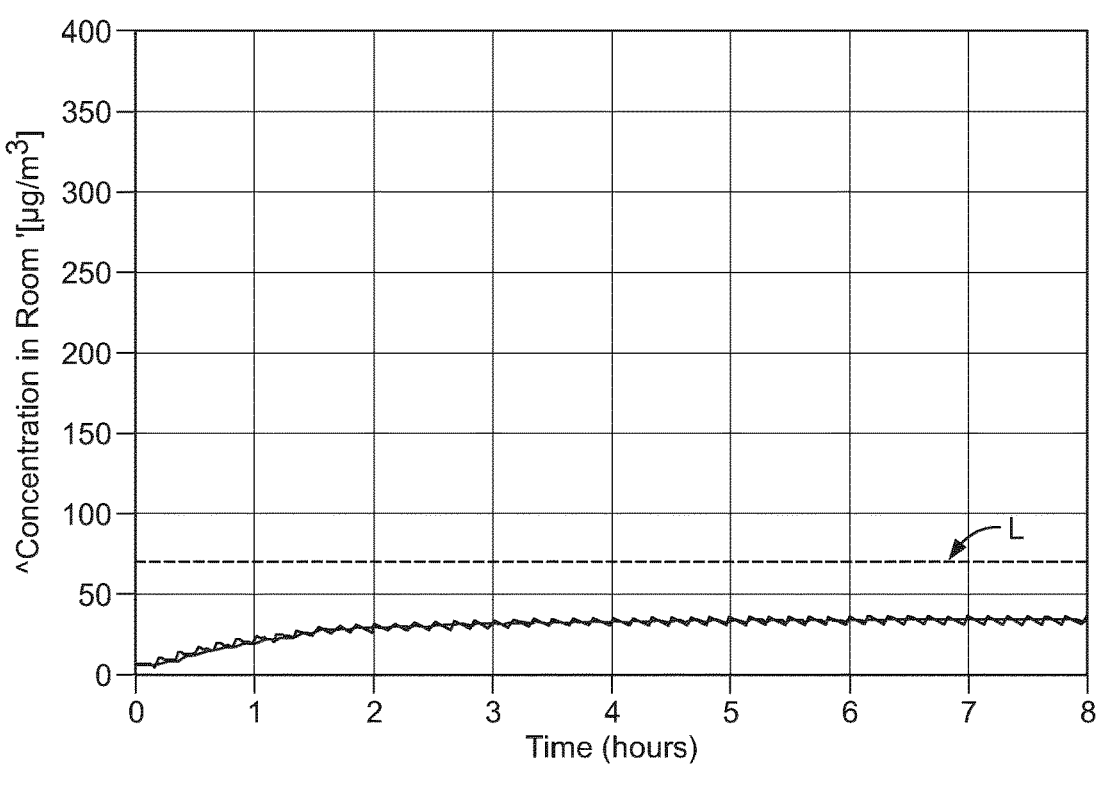
Figure 5:
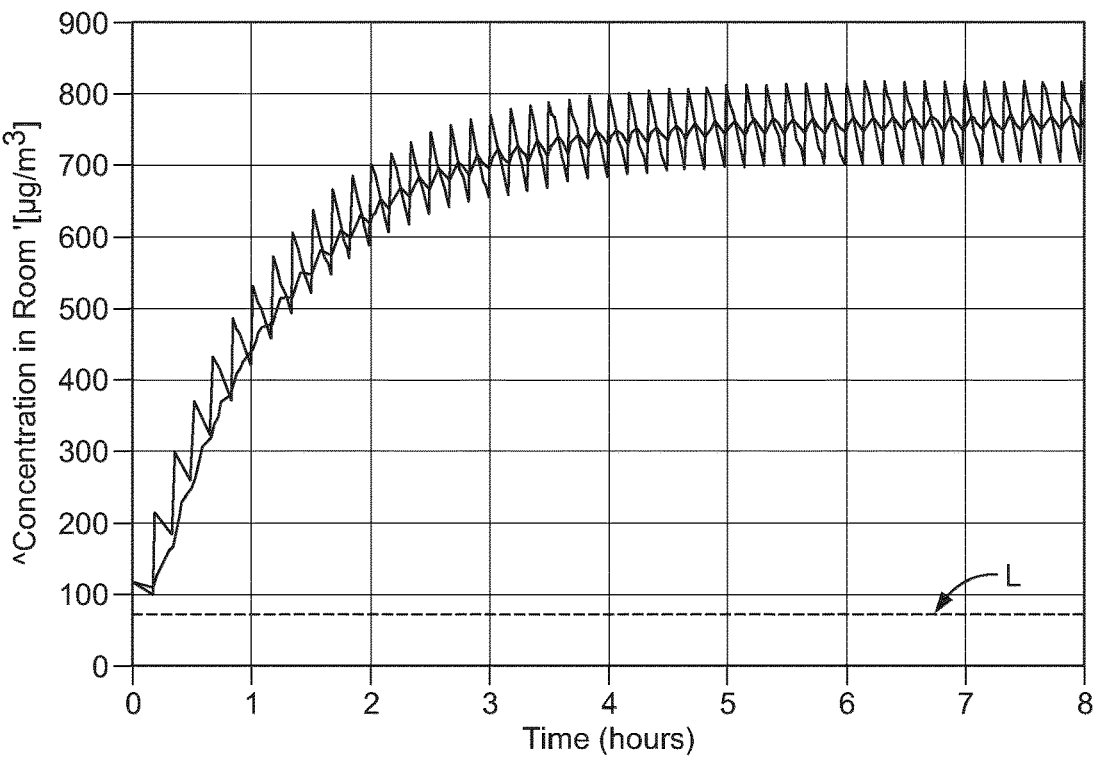

For example, this calculation is illustrated by the curves of FIGS. 4 and 5 providing the concentration ($\mu g/m^3$) of diacetyl in the room during a period of 8 hours when the specific system 10 of roasting apparatus 2 and smoke treating unit 3 of FIG. 1 is operated consecutively to roast 5 kg of *Robusta* beans per batch of 100 g of beans to a dark level within a room (FIG. 4), when a system 10 of the same roasting apparatus 2 and a smoke treating unit 3 different from the one illustrated in FIG. 1 and less efficient is operated for the same desired roasting (FIG. 5).

In step 231, the control system gets access to the local health and safety regulations where the roasting system is operated.

In step 240, the determined concentration of each contaminant is compared to the concentration authorised according to local health and safety regulations.

For example, in FIG. 4, the authorised concentration of diacetyl in Netherlands is illustrated by the limit L that is 75 $\mu g/m^3$. It appears that with the roasting system 10 used in FIG. 4, the concentration of diacetyl is always maintained at a concentration of about 25 $\mu g/m^3$ inferior to that limit L On the contrary, the concentration of diacetyl is always superior to that limit L with the roasting system 10 used in FIG. 5.

Figure 6:
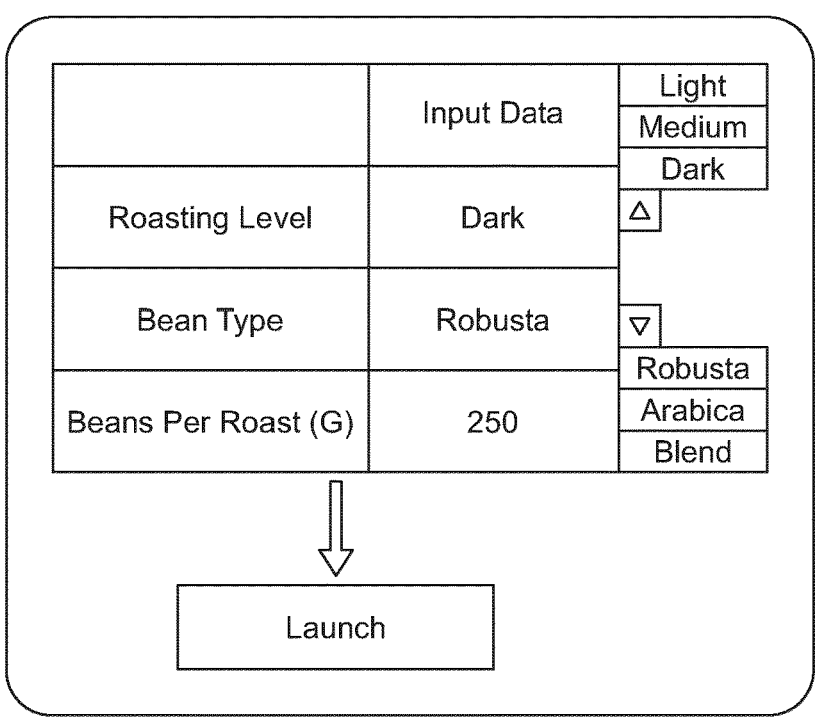
FIGS. 6 to 8 illustrate messages that can be displayed on the user interfaces before initiating a roasting operation.

If during the roasting operation of the desired roasting inputted at step 200, for each contaminant the determined concentration is inferior to the respective authorised concentration, the control system enables at step 250 the roasting operation. FIG. 6 illustrates the type of information that can be displayed on the user interface 6 in that situation.

If during the roasting operation of the desired roasting inputted at step 200, for at least one contaminant the determined concentration is superior to the respective authorised concentration, the control system displays an alert through the user interface 6 at step 251.

Figure 7:
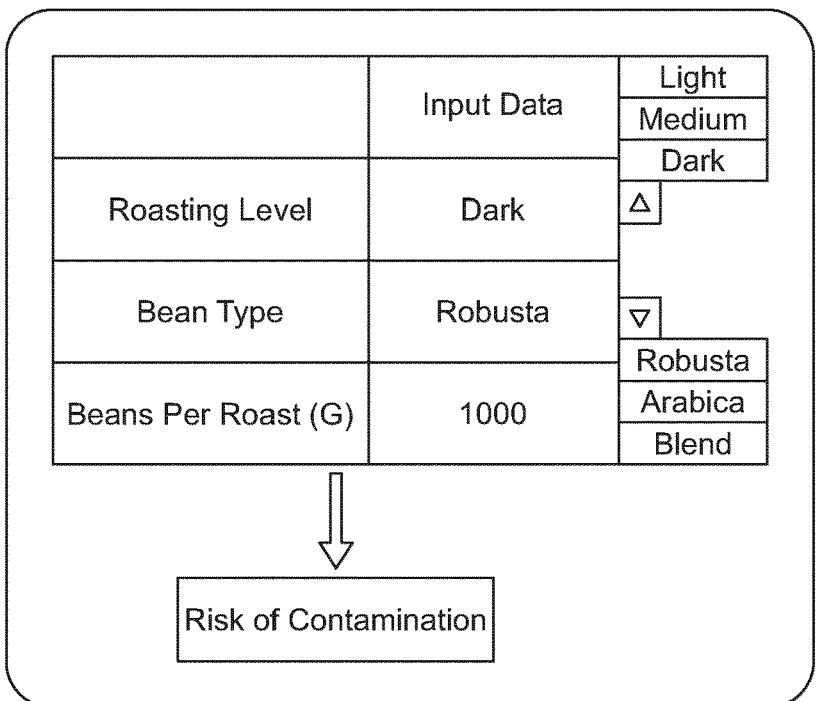
Figure 8:
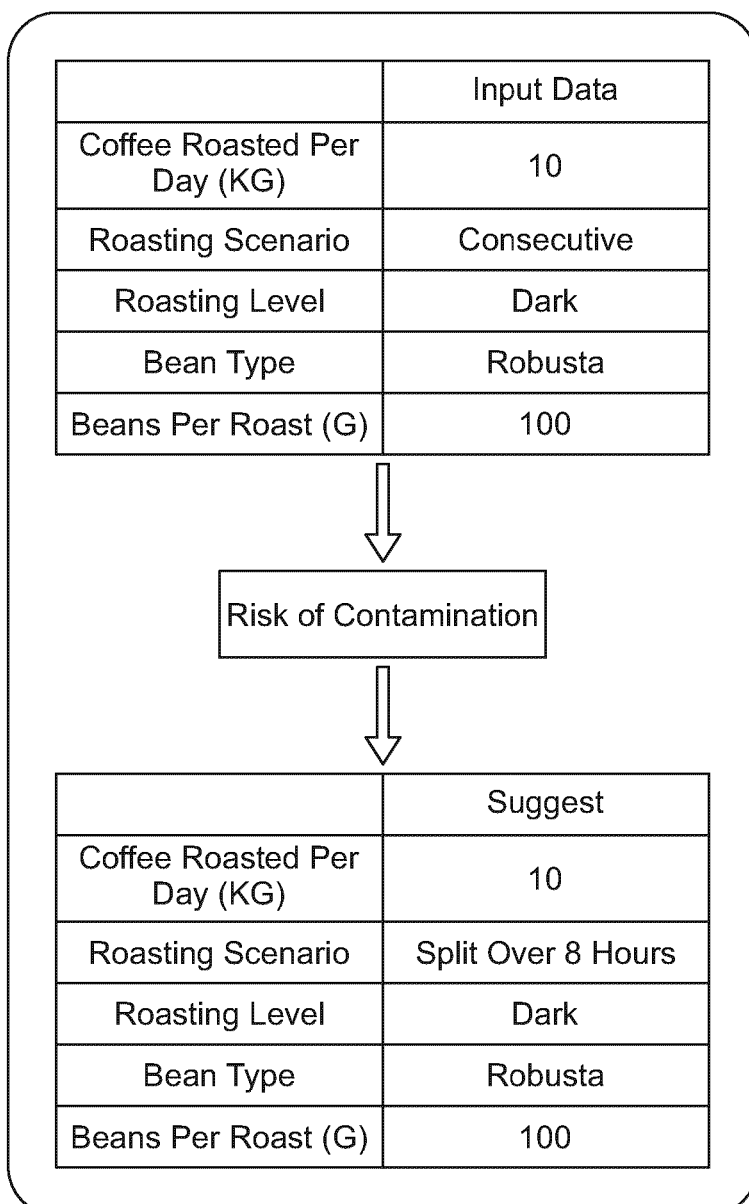

FIG. 7 illustrates the type of information that can be displayed on the user interface 6 in that situation. In that situation FIG. 8 illustrates additional information that can be displayed on the user interface 6 that is suggestion of amending the roasting conditions that is here splitting the roasting operations over 8 hours rather than doing them consecutively.

LIST OF REFERENCES IN THE DRAWINGS system 10
roasting apparatus 2
heater 20
chamber 21
roaster smoke 24
smoke treating unit 3
filters 31, 32, 33
user interface 6
communication interface 61
database 62
memory unit 63
code reader 7
processing unit 8
power supply 9
room 100
ventilation device 101
sensors 102

The invention claimed is:

1. A method to roast coffee beans in a room using a roasting system, the roasting system comprising a roasting apparatus, and the method comprises at least one roasting operation comprising:

obtaining, by the roasting apparatus, desired roasting data input of the at least one roasting operation, the desired data input determining at least:

a type of coffee beans to be roasted, a quantity of coffee beans to be roasted per the at least one roasting operation or over a period of time, and a level of roasting to be applied to the coffee beans, and getting, by the roasting apparatus, access to:

information relative to the room, the room information comprising at least: local health and safety regulations, a volume of the room and a ventilation rate of the room, information relative to the roasting apparatus, the roasting apparatus information comprising at least a quantity of each contaminant produced by the roasting apparatus during the at least one roasting operation of roasting a specific quantity of a specific type of coffee beans up to a specific roasting level, and before initiating the at least one roasting operation:

determining, by the roasting apparatus, a concentration of each contaminant generated in the room during the at least one roasting operation from the obtained desired roasting data input and accessible information relative to the roasting apparatus and to the room, for each contaminant, comparing the determined concentration of the contaminant generated in the room with a concentration of the contaminant authorised according to the local health and safety regulations, if, for each contaminant, the determined concentration is inferior to the authorised concentration according to the local health and safety regulations, enabling the at least one roasting operation, and if, for at least one contaminant, the determined concentration is superior to the authorised concentration according to the local health and safety regulations, displaying an alert.

2. The method according to claim 1, wherein, based on the obtained desired roasting use data and on the accessible information relative to the roasting apparatus, the method comprises the step of obtaining the specific quantity of each contaminant produced along the at least one roasting operation.

3. The method according to claim 2, wherein, if the system comprises a smoke treating unit, and based on the accessible information relative to the smoke treating unit, for each produced contaminant, the method comprises the step of applying the yield of reduction to the obtained quantity of the contaminant produced by the roasting apparatus along the at least one roasting operation and to obtain the quantity of the contaminant dispensed by the smoke treating unit.

4. The method according to claim 2, wherein based on the accessible information relative to the ventilation rate and the room volume, for each contaminant, the method comprises the step of determining from the ventilation rate and from the obtained quantity of each contaminant dispensed by the system, the concentration of each contaminant present in the room during the at least one roasting operation.

5. The method according to claim 1, wherein the method comprises the step of preventing the at least one roasting operation if, for at least one contaminant, the determined concentration is superior to the authorised concentration according to local health and safety regulations.

6. The method according to claim 1, wherein the method comprises the step of suggesting a modification of the at least one roasting operation if, for at least one contaminant, the determined concentration is superior to the authorised concentration according to local health and safety regulations.

7. The method according to claim 6, wherein, if for at least one contaminant the determined concentration is superior to the authorised concentration according to local health and safety regulations, the method comprises the steps of:

calculating the quantity of beans to be roasted in order to get a quantity of specific components present in the room along the at least one roasting operation inferior to the authorised limits of the specific components according to local health and safety regulations, and suggesting decreasing the quantity of beans introduced in the vessel down to that calculated quantity or suggest splitting the quantity of beans in several batches of the calculated quantity and suggest roasting the batches separately at defined intervals.

8. The method according to claim 6, wherein, if for at least one contaminant the determined concentration is superior to the authorised concentration according to local health and safety regulations, the method comprises the steps of:

calculating the maximum level of roasting to be applied to the beans in order to get a quantity of specific components present in the room along the at least one roasting operation inferior to the authorised limits of the specific components according to local health and safety regulations, and suggesting decreasing the level of roasting to be applied to the beans down to that calculated maximum level.

9. The method according to claim 6, wherein, if for at least one contaminant the deduced concentration is superior to the authorised concentration according to local health and safety regulations, the method comprises the step of suggesting improving the filtering properties of the smoke treating unit, in particular by replacing the smoke treating unit by a more efficient unit and/or to increase the ventilation rate.

10. The method according to claim 1 wherein the method comprises the steps of accessing to room information, the room information comprising the quantity of at least one specific component present in the room at the moment of initiating the desired roasting operation, and wherein, if the calculated quantity of the at least one specific component present in the room along the roasting process is superior to the authorised limits of specific according to local health and safety regulations, the method comprises the step of evaluating if an interval of time before initiating roasting is necessary.

11. The method according to claim 10 wherein the method comprises the steps of:

storing information about the previous roasting operations implemented inside the room including information about:

the quantity of at least some components produced during the previous roasting processes, and the time the previous operations happened, and calculating the time length necessary for the ventilation of the room to reduce the quantity of the produced components present in the room to enable a further roasting.

12. The method according to claim 1 wherein the method comprises the steps of determining the concentration of each contaminant generated in the room during the roasting operation from at least information relative to the smoke treating unit, the information comprising at least the performance of reduction of the level of each contaminant by the smoke treating unit, and wherein the information is adjusted on account of the status of dirtiness of the smoke treating unit.

13. The method according to claim 1 wherein the method comprises the steps of:

obtaining a desired daily roasting quantity of coffee beans, and if the roasting operation is enabled, proposing a schedule of roasting operations over the day.

14. The method according to claim 1 wherein the roasting system comprises:

a duct to connect the smoke outlet of the roasting apparatus or the outlet of the smoke treating unit, the duct being configured to divert contaminants away from the room, and a device to close or open the duct, wherein, if for at least one contaminant the determined concentration is superior to the authorised concentration according to local health and safety regulations, the method comprises the step of opening the duct during the at least one roasting operation.

15. The method according to claim 1 wherein the method comprises the steps of:

storing the determined concentration of each contaminant generated in the room during the at least one roasting operation with the obtained desired roasting data input, and getting access to the stored determined concentration of each contaminant when identical roasting data input are obtained for at least one roasting operation.

16. The method according to claim 1 wherein the method comprises the steps of actuating a safe mode operation of the roasting apparatus, wherein, when the mode is actuated, the method comprises the steps of:

getting access to pre-determined unsafe roasting data, and preventing the input of the pre-determined unsafe roasting data.

17. The method according to claim 1, wherein the roasting system comprises a smoke treating unit configured to treat smoke produced by the roasting apparatus and to release the treated smoke in the room.

18. The method according to claim 17, wherein the accessible information, which is used by the roasting apparatus to determine the concentration of each contaminant generated in the room during at least one roasting operation, is further related to the smoke treating unit.

\* \* \* \* \*